United States Patent
Shiraishi et al.

(10) Patent No.: US 8,769,815 B2
(45) Date of Patent: Jul. 8, 2014

(54) METHOD OF LIFTING NACELLE, NACELLE LIFTING MECHANISM, TOWER, AND WIND TURBINE GENERATOR

(71) Applicant: Mitsubishi Heavy Industries, Ltd., Tokyo (JP)

(72) Inventors: Yasuaki Shiraishi, Tokyo (JP); Kunikazu Watanabe, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/728,156

(22) Filed: Dec. 27, 2012

(65) Prior Publication Data

US 2014/0013569 A1    Jan. 16, 2014

Related U.S. Application Data

(63) Continuation of application No. PCT/JP2012/053131, filed on Feb. 10, 2012.

(51) Int. Cl.
*B23P 6/00* (2006.01)
*B25B 27/02* (2006.01)

(52) U.S. Cl.
CPC .............. *B23P 6/002* (2013.01); *B25B 27/023* (2013.01)
USPC ........ 29/889.1; 29/402.03; 29/426.5; 29/244; 29/256

(58) Field of Classification Search
CPC ....... F01D 5/005; B23P 6/002; B25B 27/023; B25B 27/062
USPC ........ 29/889.1, 402.01, 402.03, 426.1, 426.5, 29/244, 256, 282
See application file for complete search history.

(56) References Cited

U.S. PATENT DOCUMENTS

2003/0039419 A1    2/2003   Wobben
2011/0138595 A1    6/2011   Shiraishi

FOREIGN PATENT DOCUMENTS

| CN | 1423730 A    | 6/2003  |
| CN | 2610142 Y    | 4/2004  |
| CN | 1688808 A    | 10/2005 |
| CN | 101479471 A  | 7/2009  |
| DE | 2429862 A1   | 1/1976  |

(Continued)

OTHER PUBLICATIONS

Notice of Allowance in corresponding Japanese Application No. 2012-557747 mailed on Mar. 18, 2013.

(Continued)

*Primary Examiner* — Jermie Cozart
(74) *Attorney, Agent, or Firm* — Kanesaka, Berner & Partners

(57) ABSTRACT

A method of lifting a nacelle installed on a tower is provided. The method includes attaching a tapered bushing mechanism to a through-hole provided for a member of the tower; attaching a push-up bolt to the tapered bushing mechanism; and raising the push-up bolt while pushing the push-up bolt against a first member provided for the nacelle. The tapered bushing mechanism includes a tapered bushing inner cylinder and a tapered bushing outer cylinder. The tapered bushing inner cylinder includes a first taper section whose outer diameter becomes larger toward an end of the tapered bushing inner cylinder and a first screw thread formed on an inner surface of the tapered bushing inner cylinder. The tapered bushing outer cylinder includes a second taper section whose inner diameter becomes smaller toward an end of the tapered bushing outer cylinder.

13 Claims, 17 Drawing Sheets

(56) References Cited

FOREIGN PATENT DOCUMENTS

| | | | | |
|---|---|---|---|---|
| GB | 682562 | A | 11/1952 | |
| JP | 01310872 | A * | 12/1989 | ............ B25B 27/073 |
| JP | 4-308196 | A | 10/1992 | |
| JP | 04308196 | A | 10/1992 | |
| JP | 2003-518594 | A | 6/2003 | |
| JP | 2003518594 | A | 6/2003 | |
| JP | 2008-039091 | A | 2/2008 | |
| JP | 2008039091 | A | 2/2008 | |
| JP | 4699571 | B1 | 3/2011 | |
| WO | 03100249 | A1 | 12/2003 | |
| WO | 2008000267 | A1 | 1/2008 | |
| WO | 2011 114549 | A1 | 9/2011 | |
| WO | 2011114549 | A1 | 9/2011 | |

OTHER PUBLICATIONS

Written Opinion of the ISA (Japanese Language Version).
Written Opinion of the ISA (English Translation) with a verification of accurate translation.
International Search Report (Japanese Language Version).
Notice of Allowance as mailed on Feb. 28, 2013 in corresponding Korean Application No. 2012-7034207.
Office Action mailed Apr. 16, 2014, corresponds to Chinese patent application No. 201280001863.X.

* cited by examiner

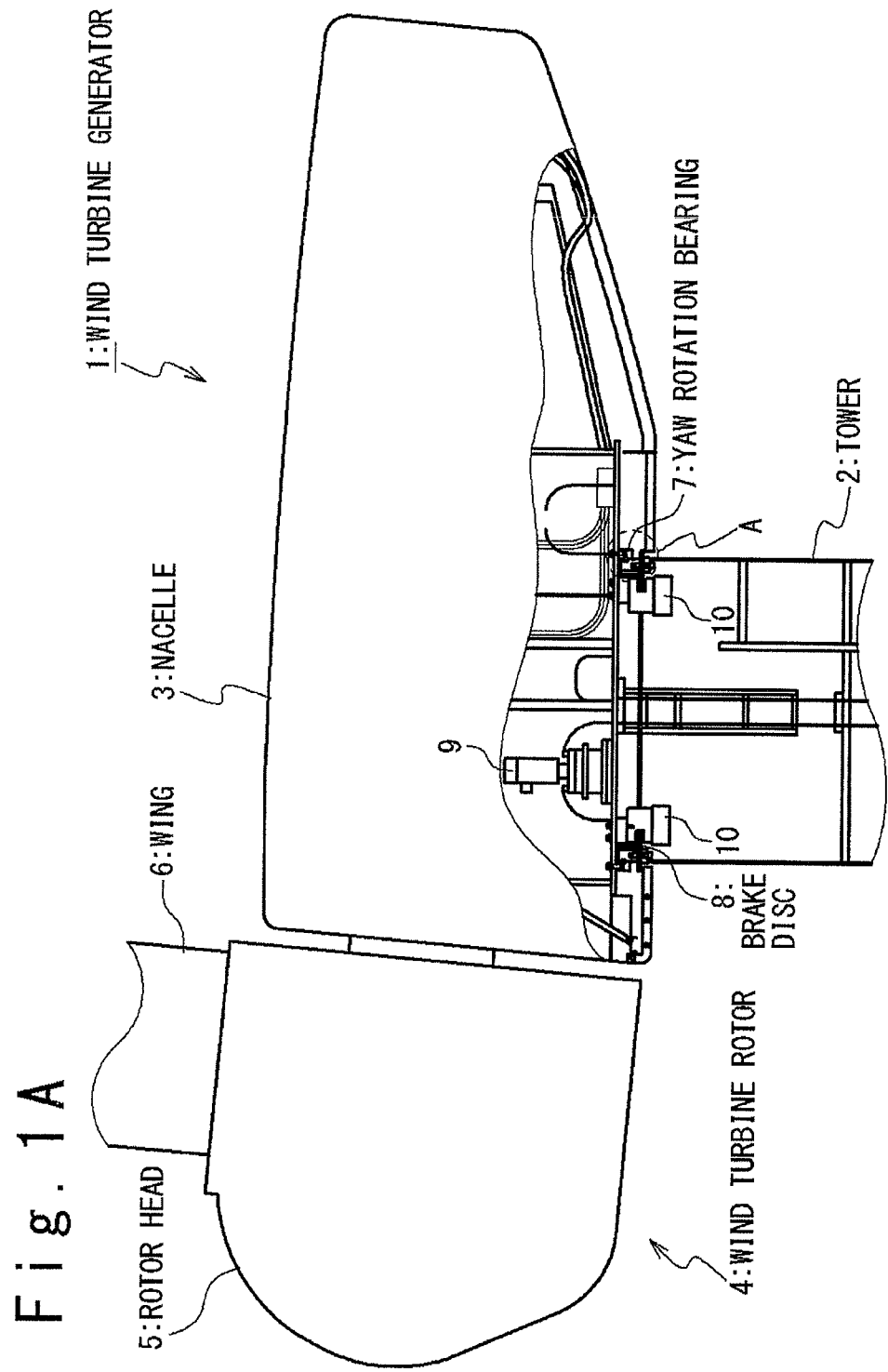

IV-IV

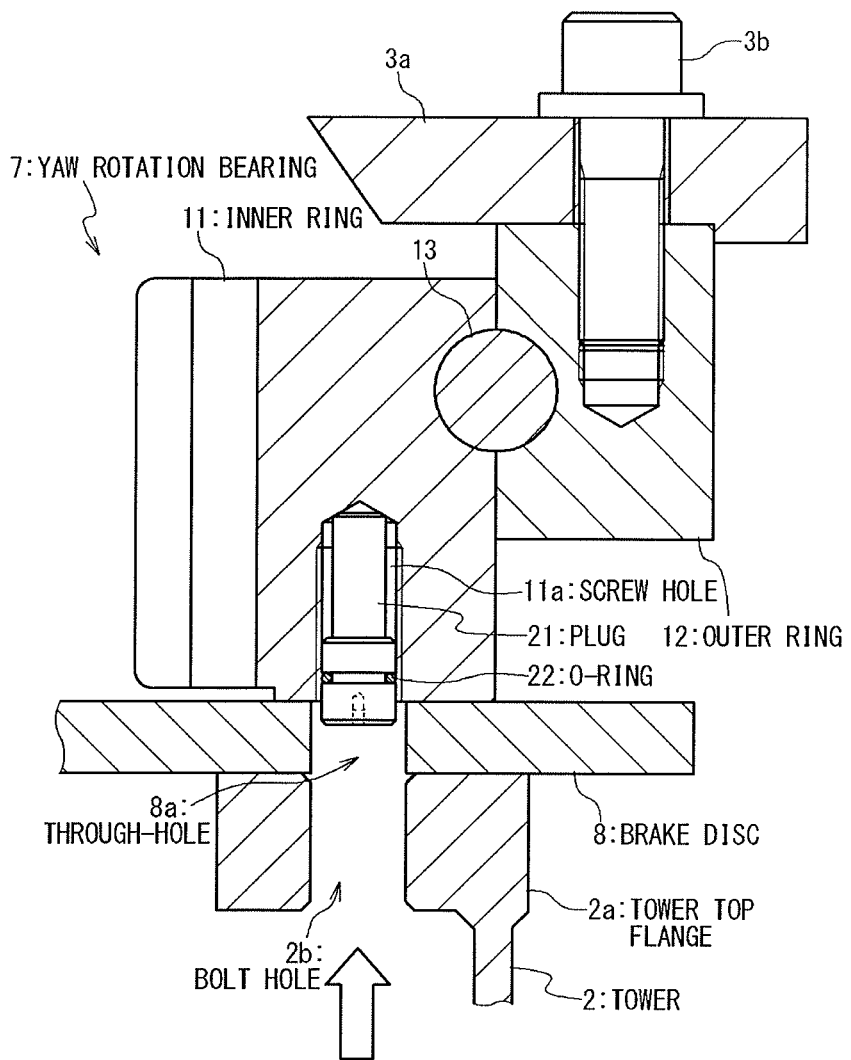

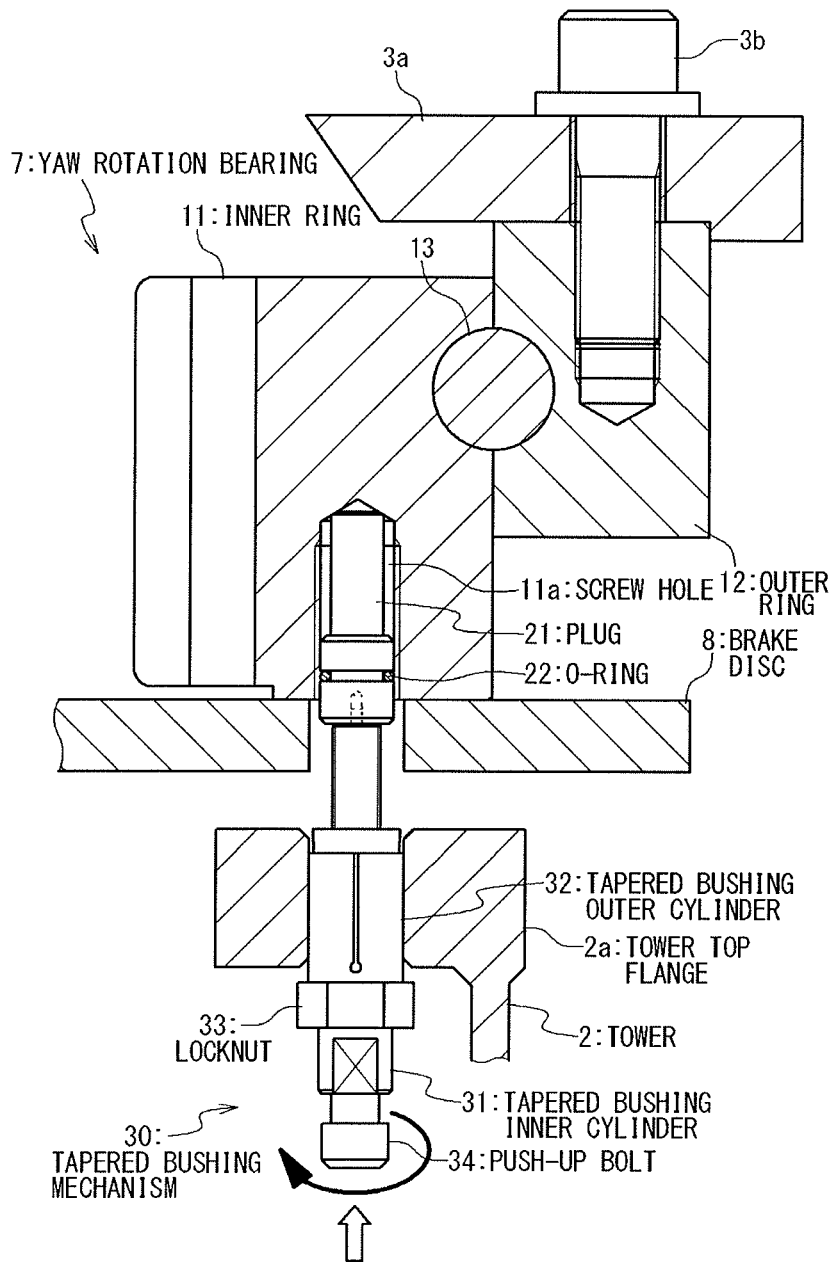

METHOD OF LIFTING NACELLE, NACELLE LIFTING MECHANISM, TOWER, AND WIND TURBINE GENERATOR

RELATED APPLICATIONS

The present application is a by-pass continuation of International Application Number PCT/JP2012/053131, filed Feb. 10, 2012, the disclosure of which is hereby incorporated by reference herein in its entirety.

TECHNICAL FIELD

The present invention relates to a method of lifting a nacelle to separate the nacelle from a tower, and a nacelle lifting mechanism used for the same.

BACKGROUND ART

In a maintenance work of a wind turbine generator, there is a work necessary to separate a nacelle and a tower. As such a maintenance work, for example, there are an exchange of a yaw rotation bearing or bearing seal, an adjustment of a shim attached to a tower top flange, a coating of an outer ring of the yaw rotation bearing, and a repair of a lower portion of a nacelle cover.

When the nacelle and the tower are separated for the maintenance work, the nacelle is typically removed from the tower and brought down onto the ground by using a large crane. After that, a desirable maintenance work is performed on the nacelle. However, there are two problems in the procedure of the above maintenance work. The first problem lies in the necessity of many equipment and materials and persons and the necessity of legal preparations (for example, acquisition of a road use permission and the like). This implies that a large expense and a long time period are required for the maintenance work. The second problem lies in the necessity of a wide site in which the nacelle and a wind turbine rotor are located. There is a case that the site necessary for the maintenance work amounts to a square of several tens of meters. This decreases the freedom of the maintenance work. If the maintenance work can be carried out while separating the nacelle and the tower without using the large crane, there are great merits of the reduction in the cost and the improvement of the freedom of the maintenance work, through the simplification of the maintenance work.

Japanese Patent No. 4,699,571 discloses a technique of separating a nacelle and a tower by lifting the nacelle without using a large crane. In the technique described in Japanese Patent No. 4,699,571, a reception stage is attached at the vicinity of the top end of the tower, and a jack is provided on the reception stage. This jack is used to lift the nacelle. However, a work for attaching the reception stage at the vicinity of the top end of the tower is not always easy. For example, when the reception stage is attached to the tower by welding, a work time becomes long for the difficulty of the welding work at a high location. Also, as disclosed in the above reference, a method of tapping a tower top flange to form a female screw and then engaging a bolt with the female screw to attach the reception stage requires a long work time.

As mentioned above, a technical need exists for a maintenance work carried out while separating the nacelle and the tower at a little work amount without using any large crane.

CITATION LIST

[Patent Literature 1] Japan Patent No. 4,699,571

SUMMARY OF THE INVENTION

Therefore, an object of the present invention is to provide a technique for a maintenance work of separating a nacelle and a tower carried out at a little work amount without using a large crane.

In a view of the present invention, a method of lifting a nacelle installed on a tower, includes: attaching a tapered bushing mechanism to a through-hole provided for a member of the tower; attaching a push-up bolt to the tapered bushing mechanism; and raising the push-up bolt while pushing the push-up bolt against a first member provided for the nacelle. The tapered bushing mechanism includes a tapered bushing inner cylinder and a tapered bushing outer cylinder. The tapered bushing inner cylinder includes a first taper section whose outer diameter becomes larger toward an end of the tapered bushing inner cylinder and a first screw thread formed on an inner surface of the tapered bushing inner cylinder. The tapered bushing outer cylinder includes a second taper section whose inner diameter becomes smaller toward an end of the tapered bushing outer cylinder. The attaching the tapered bushing mechanism to the through-hole includes: inserting the tapered bushing mechanism in the through-hole such that the end of the tapered bushing inner cylinder is positioned on an up side, the end of the tapered bushing outer cylinder is positioned on a down side, an outer circumferential surface of the first taper section and an inner surface of the second taper section contact, and an outer circumferential surface of the tapered bushing outer cylinder contacts the through-hole; pulling down the tapered bushing inner cylinder in a state that the tapered bushing mechanism has been inserted in the through-hole. The raising of the push-up bolt includes turning the push-up bolt in a state that the push-up bolt has been engaged with the first screw thread.

In a desirable embodiment, a through-hole is formed in the tower top flange installed in the upper end on the tower.

The method may further include removing a bolt which couples the first member with the tower and which has been engaged with a screw hole provided for the first member through the through-hole; and inserting a plug in the screw hole. The raising the push-up bolt includes pushing the push-up bolt against the plug.

In an embodiment, the first member includes a yaw rotation bearing which rotatably couples the nacelle with the tower.

It is desirable that the pulling down the tapered bushing inner cylinder includes: screwing a locknut with a second screw thread provided for the outer circumferential surface of the tapered bushing inner cylinder in the state that the locknut is pushed to the tapered bushing outer cylinder.

The tapered bushing inner cylinder is coupled with the first taper section and includes a screw section in which the second screw thread is formed. The screw section has two flat receptor surfaces which are parallel to each other surfaces. In this case, the receptor surfaces are caught by a tool to support the tapered bushing inner cylinder, when the locknut is engaged with the second screw thread.

It is desirable that that a slit is provided for the tapered bushing outer cylinder to extend in a length direction of the tapered bushing outer cylinder. In this case, the tapered bushing outer cylinder further includes a through-hole which communicates with the slit at an end of the slit and which penetrates between the outer surface and the inner surface of the tapered bushing outer cylinder.

In the other viewpoint of the present invention, a nacelle lifting mechanism which is attached to a through-hole provided for a member of a tower. The nacelle lifting mechanism includes a tapered bushing inner cylinder; a tapered bushing outer cylinder; and a push-up bolt pushed against a member provided for the nacelle. The tapered bushing inner cylinder includes a first taper section whose outer diameter becomes larger toward an end of the tapered bushing inner cylinder and a first screw thread which is engaged with the push-up bolt and formed on inner surface of the tapered bushing inner cylinder. The tapered bushing outer cylinder includes a second taper section whose inner diameter becomes smaller toward an end of the tapered bushing outer cylinder, and an outer circumferential surface pushed against the through-hole. The second taper section includes an inner surface of a shape which fits with a shape of the outer circumferential surface of the first taper section. The push-up bolt moves in a length direction of the tapered bushing inner cylinder, when the push-up bolt is turned in a state that the push-up bolt has been engaged with the first screw thread.

In a desirable embodiment, the nacelle lift mechanism is provided with a locknut which fastens the tapered bushing inner cylinder and the tapered bushing outer cylinder. The tapered bushing inner cylinder further includes a screw section coupled with the first taper section, and a second screw thread is formed on the outer circumferential surface of the screw section so as to be engaged with the locknut.

According to the present invention, the maintenance work to separate a nacelle and the tower becomes able to be implemented without using a large-sized crane with the smaller work amount.

BRIEF DESCRIPTION OF THE DRAWINGS

FIG. 1A is a partially sectional view showing a structure of a wind turbine generator to which a maintenance method of an embodiment of the present invention is applied;

FIG. 6B is a partially sectional view showing a procedure of lifting the nacelle in the embodiment;

FIG. 6E is a partially sectional view showing a procedure of lifting the nacelle in the embodiment;

DESCRIPTION OF EMBODIMENTS

Figure 1B:
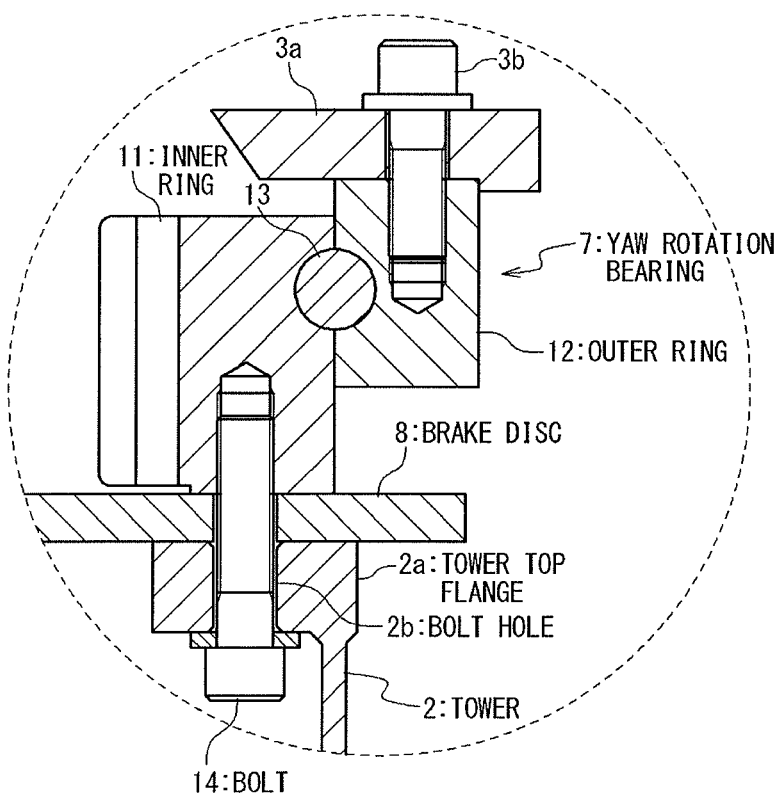
FIG. 1B is a sectional view showing a structure of an A portion in FIG. 1A.

FIG. 1A is a partially sectional view showing a structure of a wind turbine generator to which a maintenance method according to an embodiment of the present invention is applied. At first, the outline of the configuration of a wind turbine generator 1 will be described. The wind turbine generator 1 contains a tower 2, a nacelle 3 provided on the tower 2, and a wind turbine rotor 4 that is rotatably attached to the nacelle 3. The wind turbine rotor 4 contains a rotor head 5 and wings 6. Although FIG. 1A shows only one wing 6, a plurality of wings 6 (typically, three wings 6) are actually attached to the rotor head 5.

A yaw rotation bearing 7 is provided between the nacelle 3 and the tower 2. The nacelle 3 is rotatably attached to the tower 2 by the yaw rotation bearing 7. In detail, as shown in FIG. 1B, a tower top flange 2a is provided at the top of the tower 2. On the other hand, the yaw rotation bearing 7 contains an inner ring 11, an outer ring 12 and rolling elements 13 (steel balls in the present embodiment) inserted between them. The inner ring 11 has a screw hole 11a formed therein. A brake disc 8 is put between the inner ring 11 and the tower top flange 2a. The brake disc 8 has a through-hole 8a formed therein, and the tower top flange 2a has a bolt hole 2b formed therein. A bolt 14 passes through the bolt hole 2b and the through-hole 8a, and engaged with the screw hole 11a. Consequently, the inner ring 11 is attached to the tower top flange 2a provided at the top of the tower 2. Here, attention should be paid to a fact that no screw thread is formed on the bolt hole 2b. On the other hand, the outer ring 12 of the yaw rotation bearing 7 is attached to a nacelle base 3a of the nacelle 3 by a bolt 3b.

Referring to FIG. 1 again, a yaw rotation mechanism is provided in a lower portion of the nacelle 3. The yaw rotation mechanism contains a yaw motor 9 for generating a driving force for yaw rotation, and yaw brake calipers 10 for putting the brake disc 8 therein and braking the rotation of the nacelle 3.

In the wind turbine generator 1 having the above configuration, a method of carrying out the maintenance work while separating the nacelle 3 and the tower 2 will be described below. In the present embodiment, a nacelle lifting mechanism for lifting up the nacelle 3 is attached to the tower 2 so that the nacelle 3 and the tower 2 are separated. This makes it possible to separate the nacelle 3 and the tower 2 without using any large crane for suspending the nacelle 3, which contributes to reduction in a work amount.

One problem lies in a method of attaching the nacelle lifting mechanism to the tower 2. As the simplest method, the nacelle lifting mechanism could be considered to be attached to the tower 2 by bolts. However, in case of the existing wind turbine generator, a structure in which the screw thread having strength enough to attach the nacelle lifting mechanism is formed is not always provided in the tower 2. On the other hand, a work for forming the screw thread on the tower 2 has to be generally carried out in a high location, especially, in case of the existing wind turbine generator. Thus, a long work time is required. Also, even in a method of attaching the nacelle lifting mechanism to the tower 2 by welding, the work in the high location is required, similarly to the above example for the existing wind turbine generator.

Figure 2:
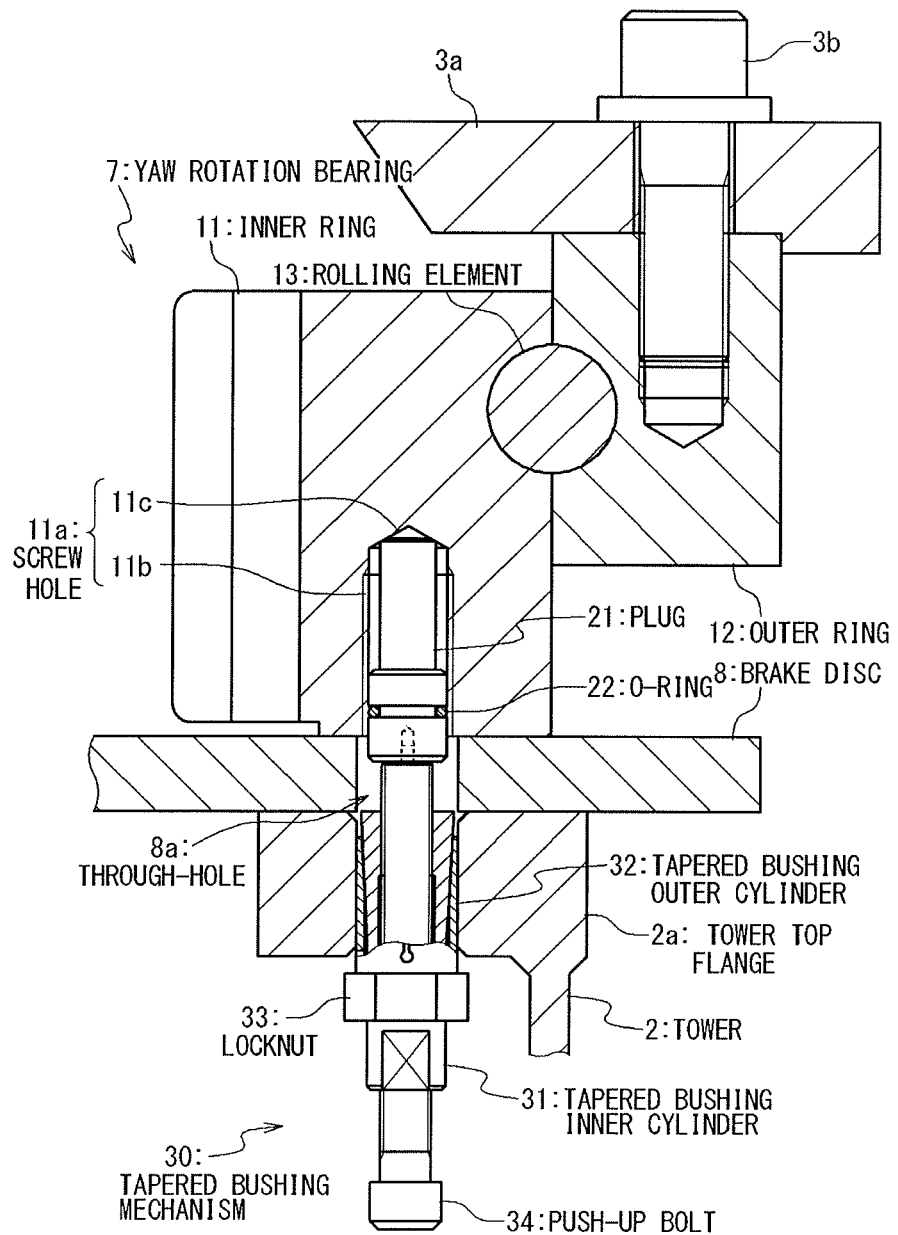
FIG. 2 is a partially sectional view showing a structure of a tapered bushing mechanism in the embodiment.

In the present embodiment, attention is paid to a case that there is a through-hole with no screw thread formed in the tower 2, and a method is employed which uses such a through-hole to attach the nacelle lifting mechanism to the tower 2. More specifically, as shown in FIG. 2, a tapered bushing mechanism 30 is attached to a bolt hole 2b which is formed in the tower top flange 2a such that the bolt 14 attaches the yaw rotation bearing 7 to the tower top flange 2a. Attention should be paid to a fact that the screw thread is not formed in the bolt hole 2b. The nacelle 3 is separated from the tower 2 by using the tapered bushing mechanism 30, a plug 21 and a push-up bolt 34, and then lifting the nacelle 3. The tapered bushing mechanism 30 has a structure that a hoop force is applied to the inner surface of the bolt hole 2b when a load is applied to a direction of gravitational force, and also has the structure that a strong frictional force is generated on the inner surface of the bolt hole 2b with this hoop force to support the nacelle 3. The plug 21, the tapered bushing mechanism 30 and the push-up bolt 34, which are used to lift the nacelle 3, will be described below in detail.

The plug 21 is inserted into the screw hole 11a of the inner ring 11 and used as a receptor member against which the push-up bolt 34 is pushed. The plug 21 is formed of metal, for example, typically, steel material. A screw thread 11b is formed in an inlet port of the screw hole 11a of the inner ring 11 but is not formed in the end 11c of screw hole 11a. The plug 21 is used to push its tip against the end 11c of the screw hole 11a. An O-ring 22 made of elastic material is attached to the plug 21. The plug 21 is inserted into the O-ring 22, and the O-ring 22 is mounted to surround the outer circumferential surface of the plug 21. A stress is applied to the screw hole 11a in the radial direction of the plug 21 with the elastic force of the O-ring 22, and consequently, the plug 21 is tentatively fixed not to be separated from the screw hole 11a.

Figure 3A:
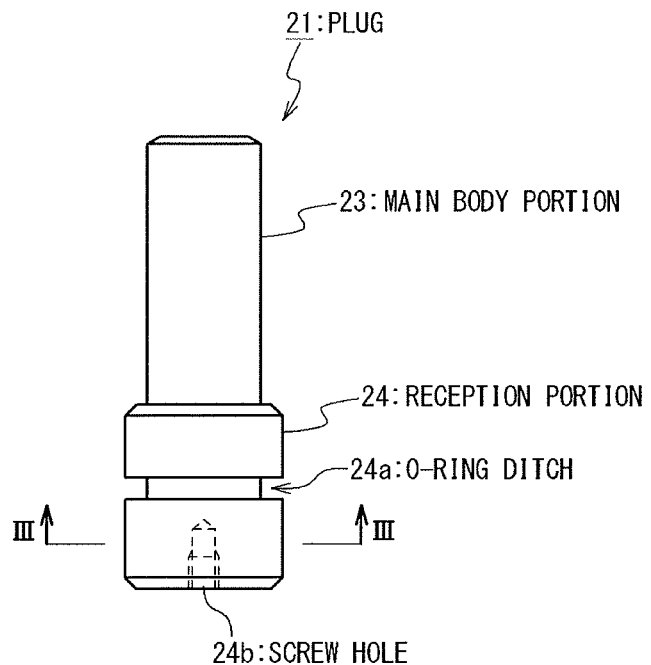
FIG. 3A is a front view showing a structure of a plug in the embodiment.
Figure 3B:
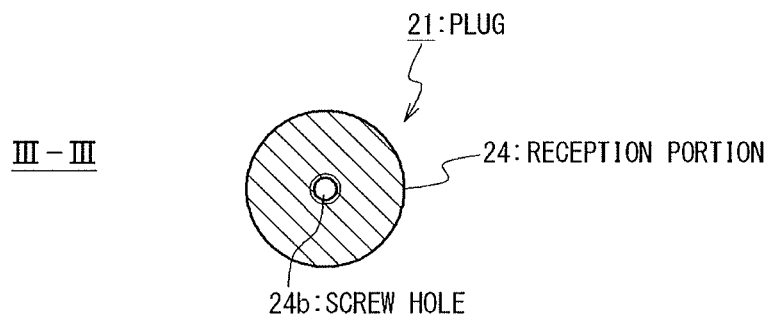
FIG. 3B is a sectional view showing a planar structure of a plug along a line III-III in FIG. 3A.

FIG. 3A is a front view showing the structure of the plug 21, and FIG. 3B is a sectional view showing the structure of the plug 21 along a line III-III in FIG. 3A. The plug 21 contains a main body portion 23 and a reception portion 24. Here, the main body portion 23 is a portion pushed against the end 11c of the screw hole 11a. The reception portion 24 is a portion against which the push-up bolt 34 is pushed, as described later. An O-ring ditch 24a is formed around the outer circumference surface of the reception portion 24. The O-ring 22 is mounted in the O-ring ditch 24a. Moreover, a screw hole 24b is formed in the end of the reception portion 24. The screw hole 24b is used when the plug 21 is taken out from the screw hole 11a. A tool on which male screw is formed is engaged with the screw hole 24b, and the tool is pulled so that the plug 21 can be pulled out from the screw hole 11a.

Referring to FIG. 2 again, the tapered bushing mechanism 30 is attached to the bolt hole 2b provided for the tower top flange 2a. The tapered bushing mechanism 30 contains a tapered bushing inner cylinder 31, a tapered bushing outer cylinder 32 and a locknut 33. The tapered bushing inner cylinder 31 is inserted into the tapered bushing outer cylinder 32, and the outer surface of the tapered bushing outer cylinder 32 is pushed against the bolt hole 2b of the tower top flange 2a. As described later, the locknut 33 has a role to fasten the tapered bushing inner cylinder 31 and the tapered bushing outer cylinder 32. The tapered bushing inner cylinder 31 and the tapered bushing outer cylinder 32 are both made of metal. The tapered bushing inner cylinder 31 and the tapered bushing outer cylinder 32 are made of, for example, chrome molybdenum steel. The locknut 33 is formed of, for example, carbon steel. The structure of the tapered bushing inner cylinder 31 and the tapered bushing outer cylinder 32 will be described later in detail.

Figure 4A:
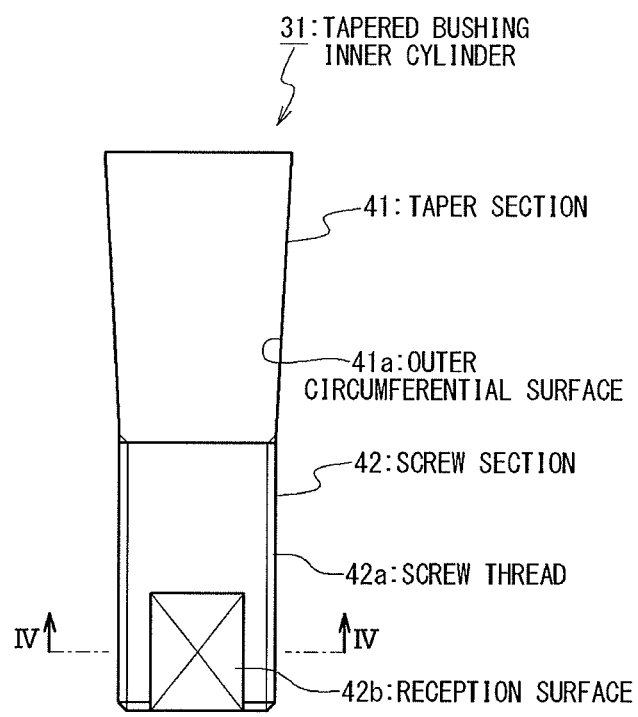
FIG. 4A is a front view showing a structure of a tapered bushing inner cylinder in the embodiment.
Figure 4B:
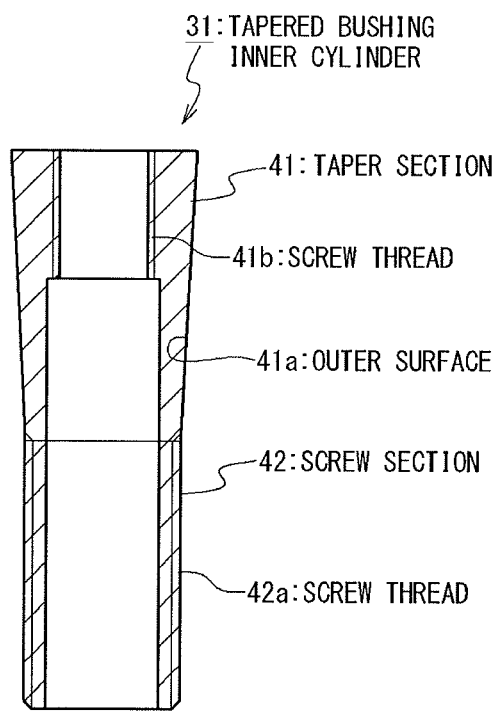
FIG. 4B is a sectional view showing the structure of the tapered bushing inner cylinder in FIG. 4A.
Figure 4C:
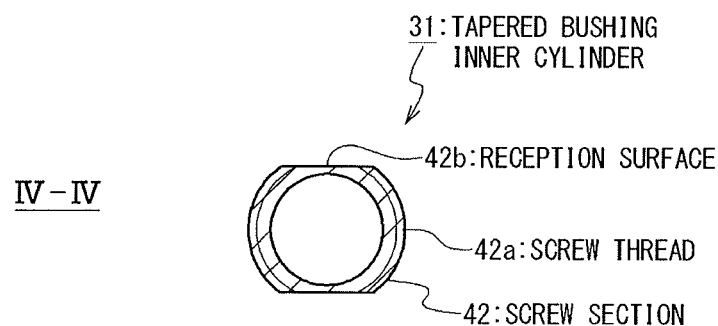
FIG. 4C is a sectional view showing a planar structure of the tapered bushing inner cylinder along a line IV-IV in FIG. 4A.

FIG. 4A is a front view showing the structure of the tapered bushing inner cylinder 31. FIG. 4B is a sectional view showing the structure of the tapered bushing inner cylinder 31. FIG. 4C is a sectional view showing the structure of the tapered bushing inner cylinder 31 on a line IV-IV in FIG. 4B. As shown in FIG. 4B, the tapered bushing inner cylinder 31 is a hollow member in which a hole penetrating in a longitudinal direction is formed. As described later, the push-up bolt 34 is inserted into the tapered bushing inner cylinder 31.

As shown in FIG. 4A, the tapered bushing inner cylinder 31 contains a taper section 41 and a screw section 42. A taper is formed on an outer circumferential surface 41a of the taper section 41. An outer diameter of the taper section 41 is increased as it is away from the screw section 42. On the other hand, a screw thread 41b is formed on the inner surface of the taper section 41 at an end portion opposite to the screw section 42, as shown in FIG. 4B. As described later, the push-up bolt 34 is turned in a state engaged with the screw thread 41b, so that a force is generated to push up the plug 21 pushed against the push-up bolt 34.

Returning to FIG. 4A again, a screw thread 42a is formed on the outer circumferential surface of the screw section 42. As described later, the screw thread 42a is engaged with the locknut 33. Moreover, two reception surfaces 42b are formed on the screw section 42. As shown in FIG. 4C, the two reception surfaces 42b are flat surfaces parallel to each other. The reception surface 42b is provided to improve a work efficiency when the locknut 33 is engaged with the screw thread 42a. When a work for engaging the locknut 33 with the screw thread 42a is carried out, a force for turning the tapered bushing inner cylinder 31 together with the locknut 33 is applied. When the locknut 33 is turned in a state that the two reception surfaces 42b are sandwiched with a tool (for example, a spanner), it is possible to prevent the tapered bushing inner cylinder 31 from being turned together with the locknut 33. Thus, the work efficiency can be improved.

Figure 5A:
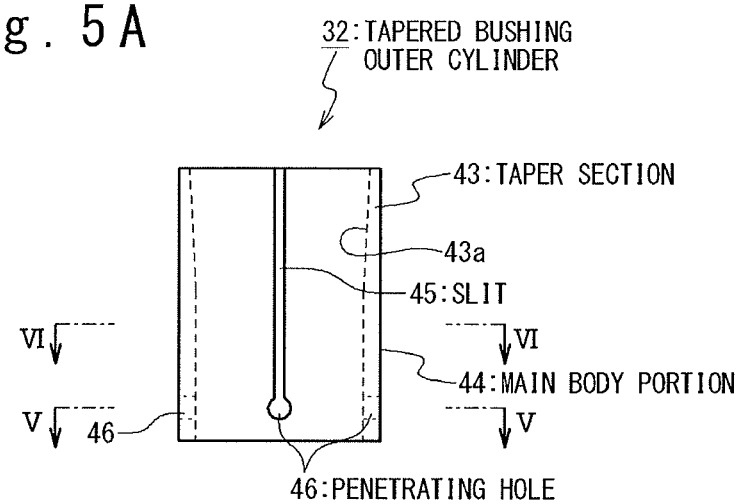
FIG. 5A is a front view showing a structure of a tapered bushing outer cylinder in the embodiment.
Figure 5B:
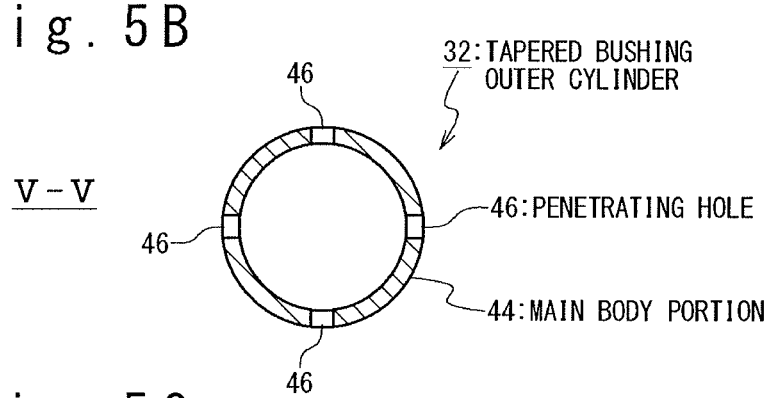
FIG. 5B is a sectional view showing a planar structure of the tapered bushing outer cylinder along a line V-V in FIG. 5A.
Figure 5C:
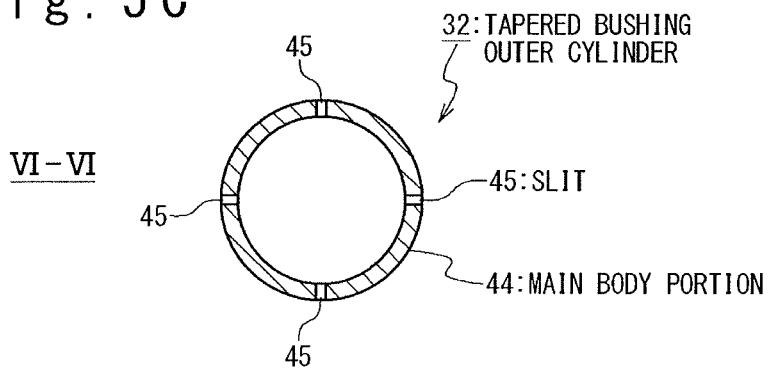
FIG. 5C is a sectional view showing a planar structure of the tapered bushing outer cylinder along a line VI-VI in FIG. 5A.

FIG. 5A is a front view showing the structure of the tapered bushing outer cylinder 32. FIG. 5B is a sectional view showing the structure of the tapered bushing inner cylinder 31 along a line V-V in FIG. 5A. FIG. 5C is a sectional view showing the structure along a line VI-VI. As shown in FIG. 5A, the tapered bushing outer cylinder 32 is a hollow member having a hole penetrating in its longitudinal direction. As described later, the tapered bushing inner cylinder 31 is inserted into the tapered bushing outer cylinder 32. The outer shape of the tapered bushing outer cylinder 32 is approximately cylindrical, and its outer diameter is substantially constant.

The tapered bushing outer cylinder 32 contains a taper section 43 and a main body portion 44. In the main body portion 44, the inner diameter is constant. On the other hand, a taper is formed on an inner surface 43a of the taper section 43. An inner diameter of the taper section 43 is increased as it is away from the main body portion 44. As described later, the inner surface 43a of the taper section 43 of the tapered bushing outer cylinder 32 is shaped to adapt the outer circumferential surface 41a of the taper section 41 of the tapered bushing inner cylinder 31. The inner surface 43a of the taper section 43 is pushed against the outer circumferential surface 41a of the taper section 41. The outer circumferential surface of the tapered bushing outer cylinder 32 is roughly surface-machined. Consequently, a frictional force is increased when the outer circumferential surface of the tapered bushing outer cylinder 32 and the bolt hole 2b are pushed against each other.

Penetrating-holes 46 are formed in the main body portion 44 of the tapered bushing outer cylinder 32 to penetrate from the inner surface to the outer circumferential surface. Slits 45 are further formed in the tapered bushing outer cylinder 32 to extend from the upper end of the taper section 43 to the penetrating holes 46. The end of the slit 45 is communicated with the penetrating hole 46. As shown in FIGS. 5B and 5C, the four slits 45 are formed at an equal interval in the circumferential direction of the tapered bushing outer cylinder 32. Moreover, the four penetrating holes 46 are formed at an equal interval in the circumferential direction. The tapered bushing outer cylinder 32 can be elastically deformed due to the slits 45.

The slit 45 has two functions. Firstly, due to the slits 45, the tapered bushing inner cylinder 31 is easily detached from the tapered bushing outer cylinder 32. The inner diameter of the tapered bushing outer cylinder 32 can be minutely expanded due to the slits 45, which enables the tapered bushing inner cylinder 31 to be easily detached. Secondly, with the slits 45, an fitting property between the outer circumferential surface of the tapered bushing outer cylinder 32 and the bolt hole 2b is improved when the outer circumferential surface of the tapered bushing outer cylinder 32 is pushed against the bolt hole 2b of the tower top flange 2a. There is a possibility that the machining precision of the bolt hole 2b is not always good, thereby the shape is distorted. Even if the shape of the bolt hole 2b is distorted, the tapered bushing outer cylinder 32 is elastically deformed through the formation of the slits 45, which can increase the contact area between the outer circumferential surface of the tapered bushing outer cylinder 32 and the bolt hole 2b.

The penetrating hole 46 also has two functions. Firstly, the penetrating hole 46 functions as a stop hole, which prevents the tapered bushing outer cylinder 32 from being broken when the slit 45 extends in the longitudinal direction while the tapered bushing outer cylinder 32 is used. Secondly, the penetrating hole 46 enables a force, which pulls out the tapered bushing outer cylinder 32, to be applied when the tapered bushing outer cylinder 32 is burnt on the bolt hole 2b of the tower top flange 2a. In the tapered bushing outer cylinder 32, in a state that the outer circumferential surface is pushed against the bolt hole 2b with a strong pressure, a great force is applied to an axial direction. Thus, there is a case that the tapered bushing outer cylinder 32 is burnt on the bolt hole 2b. The tapered bushing outer cylinder 32 can be pulled out from the bolt hole 2b by inserting a cable or tool into the penetrating hole 46 and pulling the cable or tool.

Returning to FIG. 2 again, the push-up bolt 34 is inserted into the tapered bushing inner cylinder 31 and further pushed against the plug 21. As described later, a force is applied from the push-up bolt 34 to the plug 21. Consequently, the yaw rotation bearing 7 and the nacelle 3 are lifted. As the push-up bolt 34, for example, it is possible to use a typical hexagon socket head cap screw made of chrome molybdenum steel.

Figure 6A:
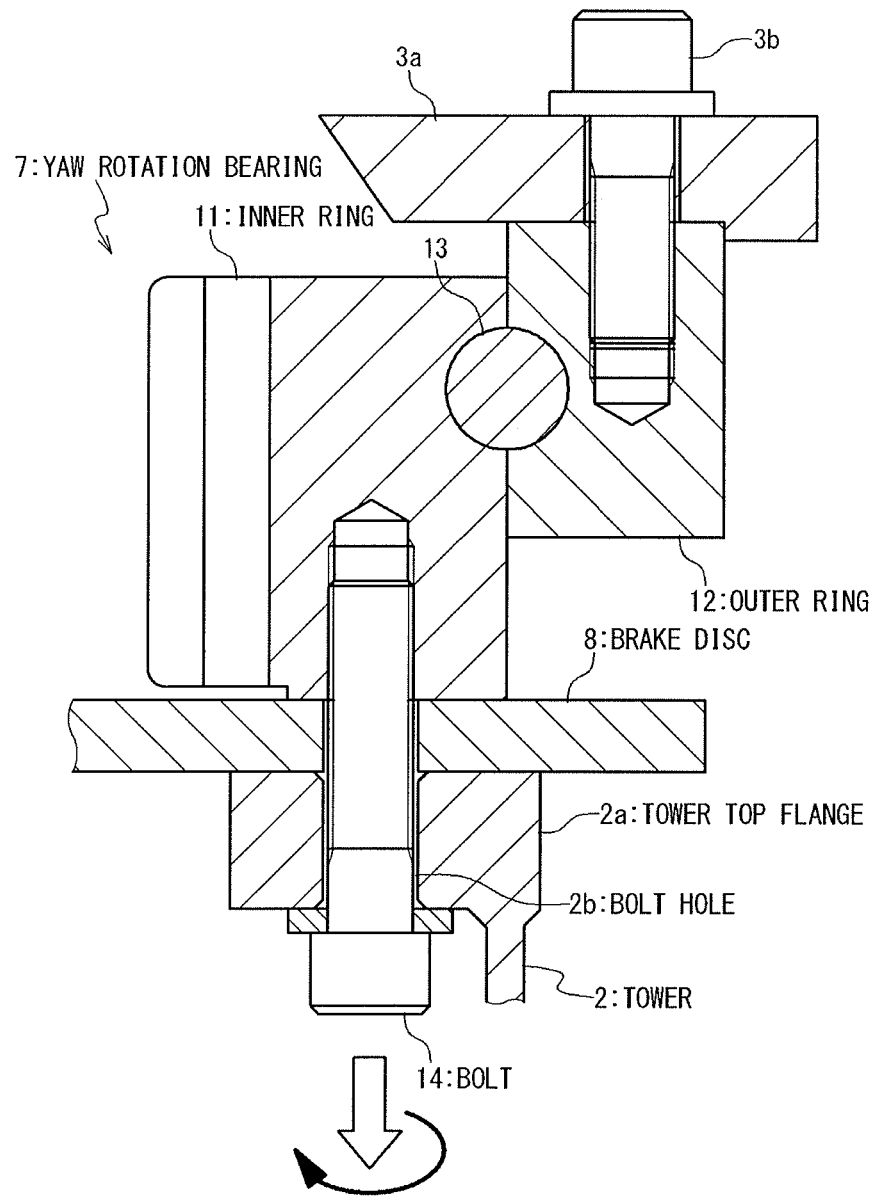
FIG. 6A is a partially sectional view showing a procedure of lifting a nacelle in the embodiment.

FIGS. 6A to 6E are views showing a procedure for lifting the nacelle 3 by using the plug 21, the tapered bushing mechanism 30 and the push-up bolt 34. As shown in FIG. 6A, at first, the bolt 14 fixing the inner ring 11 of the yaw rotation bearing 7 to the tower top flange 2a is released and taken out.

Next, as shown in FIG. 6B, the plug 21 is inserted through the bolt hole 2b of the tower top flange 2a and the through-hole 8a of the brake disc 8 into the screw hole 11a of the inner ring 11. When the plug 21 is inserted, the O-ring 22 is mounted around the plug 21. Thus, the plug 21 is tentatively fixed to the screw hole 11a with the elastic force of the O-ring 22.

Figure 6C:
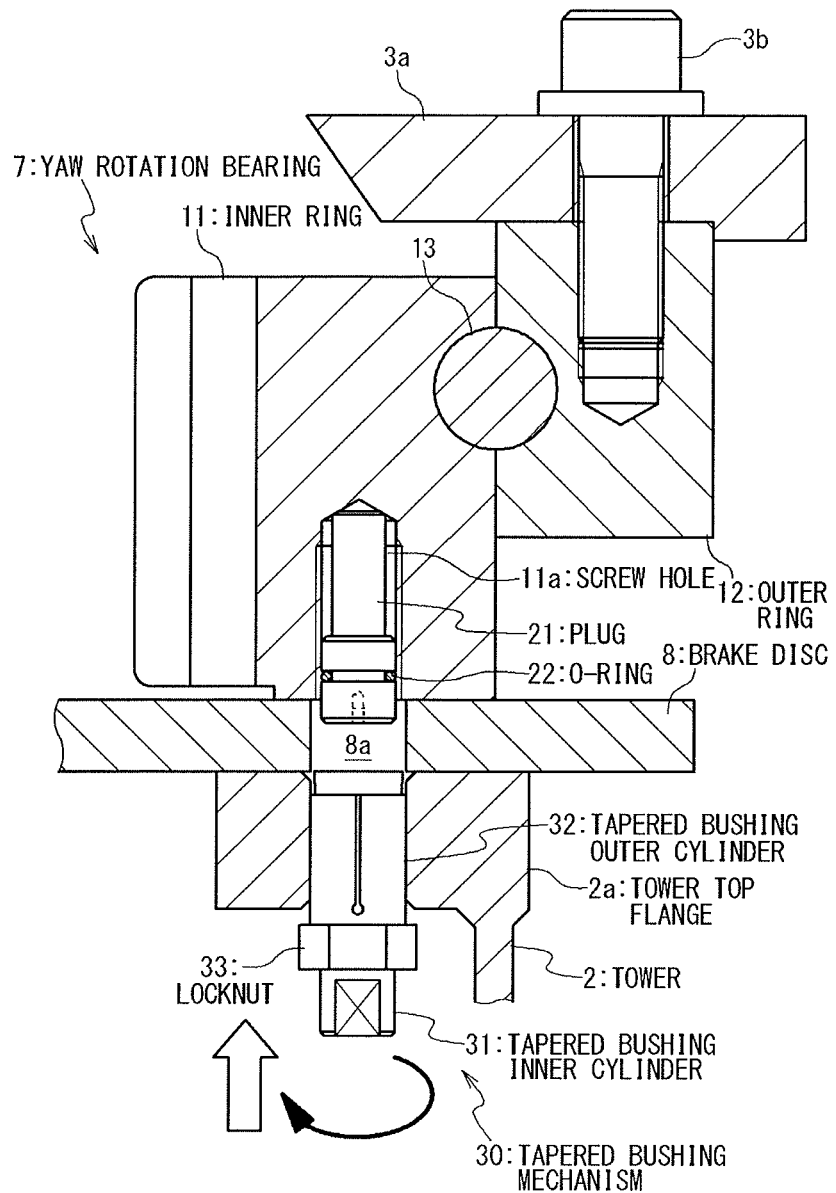
FIG. 6C is a partially sectional view showing a procedure of lifting the nacelle in the embodiment.
Figure 7:
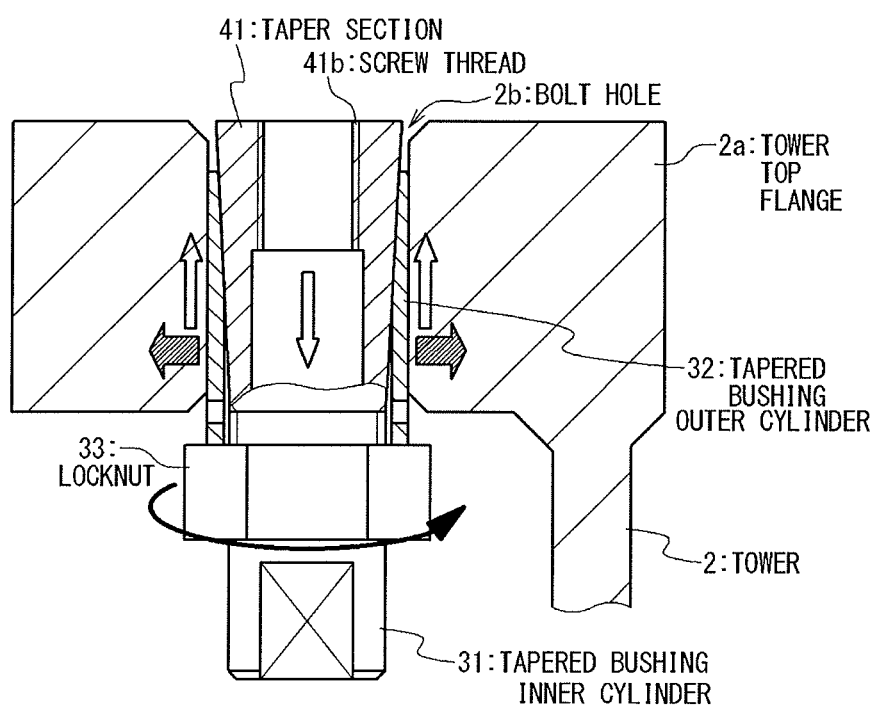
FIG. 7 is a conceptual view showing a force that is applied to a bolt hole of a tower top flange from a tapered bushing mechanism.

Next, as shown in FIG. 6C, the tapered bushing mechanism 30 is attached to the bolt hole 2b of the tower top flange 2a. In detail, as shown in FIG. 7, the tapered bushing inner cylinder 31 and the tapered bushing outer cylinder 32 are inserted into the bolt hole 2b in a state that the inner surface of the taper section 43 of the tapered bushing outer cylinder 32 is pushed against the outer circumferential surface of the taper section 41 of the tapered bushing inner cylinder 31. At this time, the tapered bushing inner cylinder 31 is oriented such that the end whose outer diameter is large is positioned up, and the tapered bushing outer cylinder 32 is oriented such that the end whose inner diameter is small is positioned down. Attention should be paid to a fact that initially, the outer diameter of the tapered bushing outer cylinder 32 is slightly smaller than the inner diameter of the bolt hole 2b.

Moreover, in a state that the locknut 33 is pushed against the end of the tapered bushing outer cylinder 32, the locknut 33 is engaged with and fastened by the screw thread 42a formed on the screw section 42 of the tapered bushing inner cylinder 31. Consequently, the tapered bushing inner cylinder 31 is downwardly pulled. As the taper section 41 of the tapered bushing inner cylinder 31 comes closer to the top end, its outer diameter becomes larger. Thus, when the tapered bushing inner cylinder 31 is pulled downwardly, the tapered bushing outer cylinder 32 is pushed against the bolt hole 2b. That is, the hoop force is applied from the tapered bushing outer cylinder 32 to the bolt hole 2b. With this hoop force, great static frictional force is generated between the tapered bushing outer cylinder 32 and the bolt hole 2b. Consequently, the taper bushing mechanism 30 is fixed to the bolt hole 2b of the tower top flange 2a.

The reception surfaces 42b formed on the screw section 42 of the tapered bushing inner cylinder 31 make a work of fastening the locknut 33 more efficient. When the locknut 33 is turned for fastening, there is a case that the tapered bushing inner cylinder 31 is turned together with the locknut 33. In such a case, if the tapered bushing inner cylinder 31 is fixed by sandwiching the two reception surfaces 42b by a tool, the tapered bushing inner cylinder 31 can be prevented from being turned together with the locknut 33. Thus, the work efficiency can be improved.

In the present embodiment, the locknut 33 is used for the lower end of the tapered bushing inner cylinder 31 to pull down the tapered bushing inner cylinder 31. However, the force for pulling down the tapered bushing inner cylinder 31 may be applied by using another mechanical device (for example, a hammer and the like). However, as described in the present embodiment, the method of using the locknut 33 and the screw thread 42a formed on the screw section 42 of the tapered bushing inner cylinder 31 and pulling down the tapered bushing inner cylinder 31 can pull down the tapered bushing inner cylinder 31 with a great force irrespectively of the simple structure. Thus, this method is preferable.

Figure 6D:
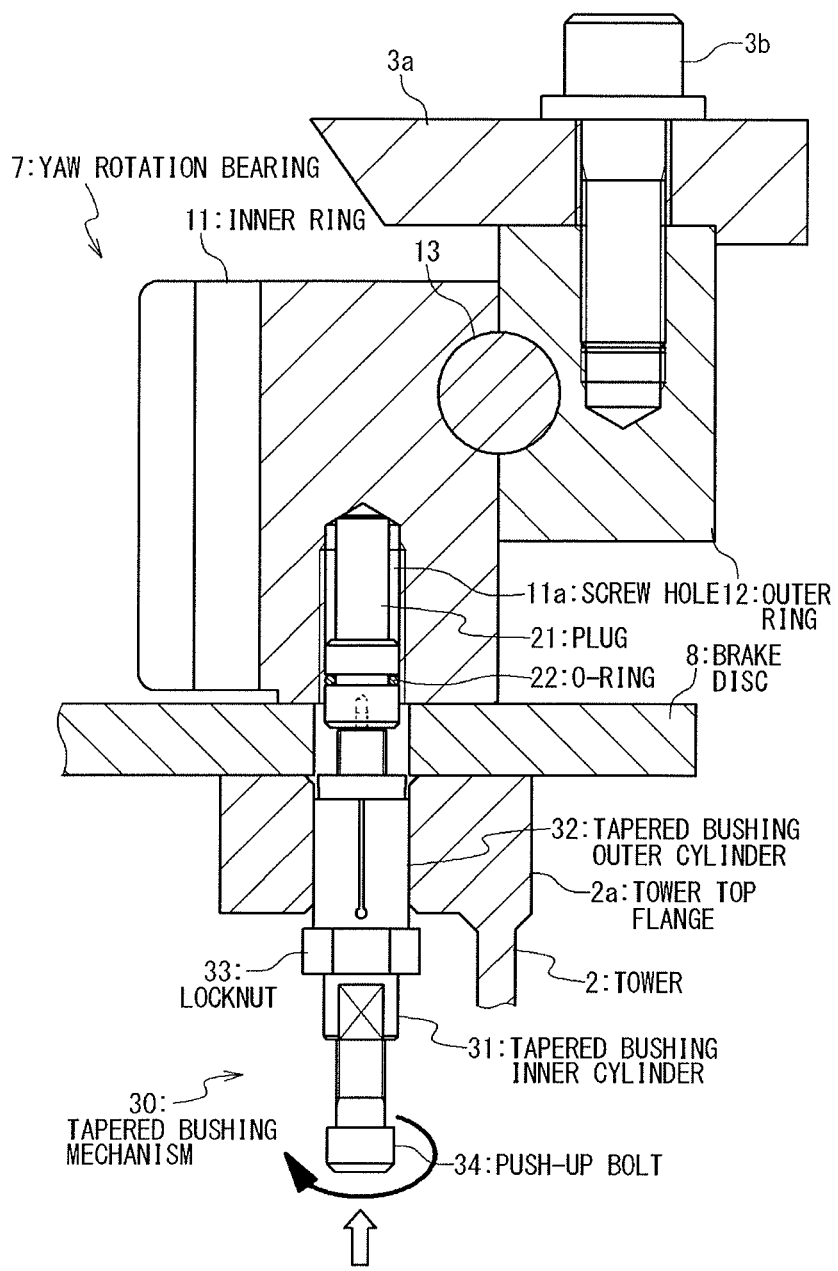
FIG. 6D is a partially sectional view showing a procedure of lifting the nacelle in the embodiment.

Next, as described in FIG. 6D, the push-up bolt 34 is engaged with the screw thread 41b (refer to FIG. 4B) formed on the inner surface of the tapered bushing inner cylinder 31. Consequently, the push-up bolt 34 is attached to the tapered bushing mechanism 30.

The procedure shown in FIGS. 6A to 6D is repeated for the desired number of times. Consequently, a plurality of plugs 21 are attached to the screw holes 11a of the inner rings 11, and a plurality of tapered bushing mechanisms 30 are mounted to a plurality of bolt holes 2b, and a plurality of push-up bolts 34 are attached to the plurality of tapered bushing mechanisms 30.

Next, as shown in FIG. 6E, the push-up bolt 34 attached to the tapered bushing mechanism 30 is turned in a particular direction (a counterclockwise direction as the most typical direction). Consequently, since the push-up bolt 34 is moved and raised along the length direction of the tapered bushing inner cylinder 31, the plug 21 and the inner ring 11 of the yaw rotation bearing 7 are pushed upwardly. At this time, in order to prevent each of the tapered bushing mechanisms 30 from being dropped, the push-up bolt 34 is operated such that a great variation is not generated between loads applied to the push-up bolts 34.

Because the yaw rotation bearing 7 is pushed upwardly by the push-up bolt 34, the nacelle 3 is separated from the tower 2. When the brake disc 8 is fixed to the inner ring 11 of the yaw rotation bearing 7, the brake disc 8 is lifted up together with the inner ring 11, as shown in FIG. 6E. However, when the brake disc 8 is fixed to the tower top flange 2a, the brake disc 8 is left in the tower top flange 2a.

When the yaw rotation bearing 7 is pushed upwardly by the push-up bolt 34, a force pushing the tapered bushing mechanism 30 downwardly by counteraction is applied. The tapered bushing mechanism 30 in the present embodiment is configured such that the tapered bushing mechanism 30 is not easily dropped from the bolt hole 2b even if the force of pushing downwardly the tapered bushing mechanism 30 is applied. As understood from FIG. 7, in the present embodiment, the outer diameter of the taper section 41 of the tapered bushing inner cylinder 31 is larger, as it is closer to the top end, and the inner diameter of the taper section 43 of the tapered bushing outer cylinder 32 is smaller as it is closer to the bottom end. Consequently, when the force of pushing downwardly is applied from the push-up bolt 34 to the tapered bushing inner cylinder 31, a force of outwardly expanding the tapered bushing outer cylinder 32 is applied. That is, when the nacelle 3 is lifted by the push-up bolt 34, the hoop force that is applied to the bolt hole 2b from the tapered bushing outer cylinder 32 becomes strong. For this reason, in the tapered bushing mechanism 30 in the present embodiment, even if the force of pushing downwardly the tapered bushing mechanism 30 is applied when the nacelle 3 is lifted, the tapered bushing mechanism 30 is not easily separated from the bolt hole 2b.

The desirable maintenance work is carried out in the state that the nacelle 3 is separated from the tower 2. As the maintenance work carried out in the state that the nacelle 3 is separated from the tower 2, for example, there are the exchange of the yaw rotation bearing 7, the exchange of the seal for the yaw rotation bearing 7, the coating of the outer ring 12, the adjustment for keeping the flatness level of the tower top flange 2a (for example, the adjustment of the shim), the repair of the bottom of the nacelle 3 and the like.

After the completion of the desirable maintenance work, the inner ring 11 can be attached to the tower top flange 2a, by carrying out a procedure opposite to the procedure shown in FIGS. 6A to 6E. At first, by turning the push-up bolt 34, the plug 21 and the inner ring 11 are lowered downwardly, and the inner ring 11 and the brake disc 8 are positioned on the tower top flange 2a. Moreover, after the removal of the push-up bolt 34, the tapered bushing mechanism 30 is detached from the bolt hole 2b of the tower top flange 2a. After the locknut 33 is removed from the tapered bushing inner cylinder 31, the tapered bushing inner cylinder 31 and the tapered bushing outer cylinder 32 are removed from the bolt hole 2b. Here, when it is burnt on the bolt hole 2b so that the tapered bushing outer cylinder 32 can not be easily removed, the cable or tool is inserted into the penetrating hole 46 of the tapered bushing outer cylinder 32. Then, the cable or tool is pulled, thereby pulling out the tapered bushing outer cylinder 32 from the bolt hole 2b. Also, even when the tapered bushing outer cylinder 32 can not be easily removed from the tapered bushing inner cylinder 31, the cable or tool is inserted into the penetrating hole 46 of the tapered bushing outer cylinder 32. Then, the cable or tool may be pulled, thereby removing the tapered bushing outer cylinder 32 from the tapered bushing inner cylinder 31.

Moreover, the bolt 14 is inserted through the bolt hole 2b of the tower top flange 2a and engaged with the screw hole 11a of the inner ring 11. Thus, the yaw rotation bearing 7 is attached to the tower top flange 2a. Therefore, the nacelle 3 is rotatably attached to the tower 2 again.

The method of separating the nacelle 3 and the tower 2 in accordance with the above procedure has various merits. Firstly, the above procedure enables the separation between the nacelle 3 and the tower 2 without using the large crane so as to contribute to the reduction in a work amount. In addition, according to the above procedure, the mechanism of lifting the nacelle 3 can be attached to the tower 2 without any necessity of performing the welding operation and the tapping process on the tower 2. Thus, this configuration is effective for the reduction in the work amount. Also, the shape of the bolt hole 2b is not substantially deformed through the work for attaching the tapered bushing mechanism 30. Thus, this can be again used to attach the inner ring 11 to the tower top flange 2a. Moreover, the above tapered bushing mechanism 30 is configured such that the hoop force applied to the bolt hole 2b from the tapered bushing outer cylinder 32 becomes strong when the downward force is applied to the tapered bushing inner cylinder 31. Thus, when the nacelle 3 is lifted, it is not easily separated from the bolt hole 2b.

As mentioned above, the embodiments of the present invention have been specifically described. However, it would be apparent for one skilled in the art that the present invention can be embodied together with various modifications.

For example, in the above-mentioned embodiments, the outer ring 12 is coupled to the nacelle 3, and the inner ring 11 is coupled to the tower top flange 2a. However, the outer ring 12 may be coupled to the tower top flange 2a, and the inner ring 11 may be coupled to the nacelle 3. In this case, through the screw hole formed in the outer ring 12 and the bolt, the outer ring 12 is coupled to the tower top flange 2a, and the plug 21 serves as the screw hole formed in the outer ring 12.

Also, the plug 21 functions as the receptor member of the push-up bolt 34, and the plug 21 is not a part essential to lifting the nacelle 3. However, the use of the plug 21 provides the following two merits. The first merit lies in a role of protecting the screw thread 11b, when the push-up bolt 34 is inserted into the screw hole 11a on which the screw thread 11b is formed, as described in the present embodiment. The second merit lies in a role of preventing the buckling of the push-up bolt 34, by decreasing the length of a portion of the push-up bolt 34, which protrudes from the tapered bushing inner cylinder 31. Thus, the use of the plug 21 is preferable.

Moreover, in the above-mentioned embodiments, the tapered bushing mechanism 30 is attached to the bolt hole 2b formed in the tower top flange 2a. However, the tapered bushing mechanism 30 may be attached to the through-hole formed in a different member of the tower 2. Also, the member against which the push-up bolt 34 is pushed is not limited to the inner ring 11. Under a condition that a sufficient strength is kept, the push-up bolt 34 can be pushed against the different member provided in the nacelle 3, and the nacelle 3 can be consequently lifted.

The tapered bushing mechanism 30 and the push-up bolt 34, which have been described in the above-mentioned embodiments, can be typically used to lift a heavy load. In particular, the heavy load provided at a high location, such as the heavy load provided in the nacelle 3, is desired to be lifted without using the crane if possible. The method of lifting the heavy load by using the tapered bushing mechanism 30 and the push-up bolt 34 as mentioned above is preferable in that the crane becomes unnecessary.

Figure 8:
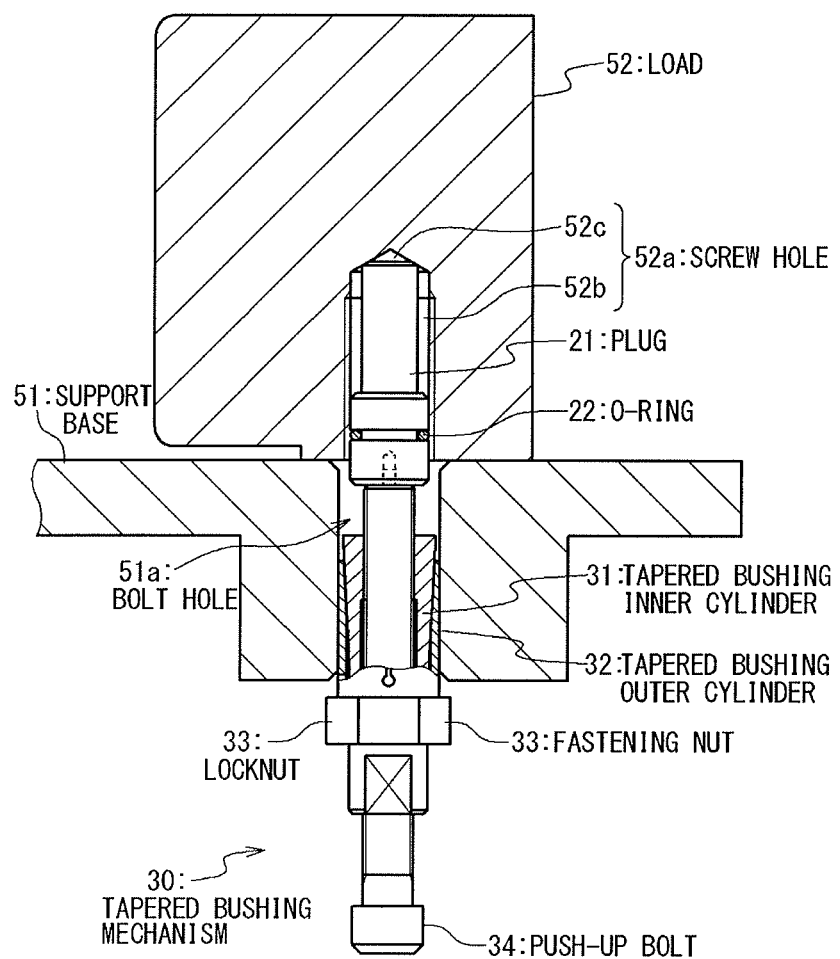
FIG. 8 is a partially sectional view showing a method of lifting a heavy load by using the tapered bushing mechanism.

FIG. 8 is a view showing an example of lifting a heavy load 52 provided on a support base 51. A bolt hole 51a is formed in a support base 51, and a screw hole 52a is formed in the lower portion of the heavy load 52. Although a screw thread 52b is formed at an inlet port of the screw hole 52a, the screw thread 52b is not formed at an end 52c. The screw hole 52a is used to fix the heavy load 52 to the support base 51 because the bolt is engaged with the screw thread 52b through the bolt hole 51a.

An operation for lifting the heavy load 52 is carried out in accordance with a procedure described below. After the bolt engaged with the screw hole 52a is removed from the screw hole 52a, the plug 21 is inserted into the screw hole 52a. Moreover, after the tapered bushing mechanism 30 is attached to the bolt hole 51a, the push-up bolt 34 is attached to the tapered bushing inner cylinder 31 of the tapered bushing mechanism 30. Moreover, when the push-up bolt 34 is turned, the tapered bushing inner cylinder 31 is pushed up, thereby lifting the heavy load 52.

In the above procedure, the mechanism of lifting the heavy load 52 can be attached to the support base 51 without performing the tapping process on the support base 51. Thus, this is effective to reduce a work amount. Also, the shape of the bolt hole 51a of the support base 51 is not substantially deformed, through the work for attaching the tapered bushing mechanism 30. Therefore, this can be used again to attach the heavy load 52 to the support base 51. Moreover, the above tapered bushing mechanism 30 is configured such that the hoop force applied to the bolt hole 51a from the tapered bushing outer cylinder 32 becomes strong when the downward force is applied to the tapered bushing inner cylinder 31. Consequently, when the heavy load 52 is lifted, it is not easily separated from the bolt hole 51a.

Figure 9A:
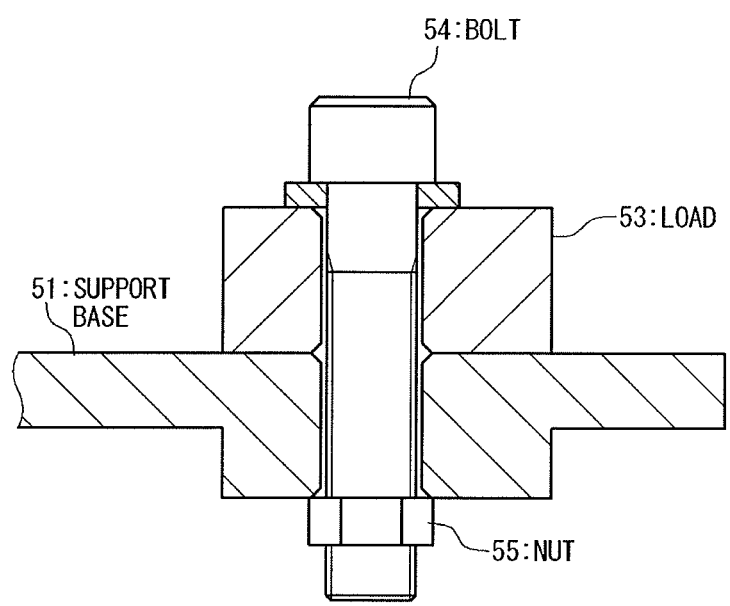
FIG. 9A is a sectional view showing a state that a support base and the heavy load are coupled.
Figure 9B:
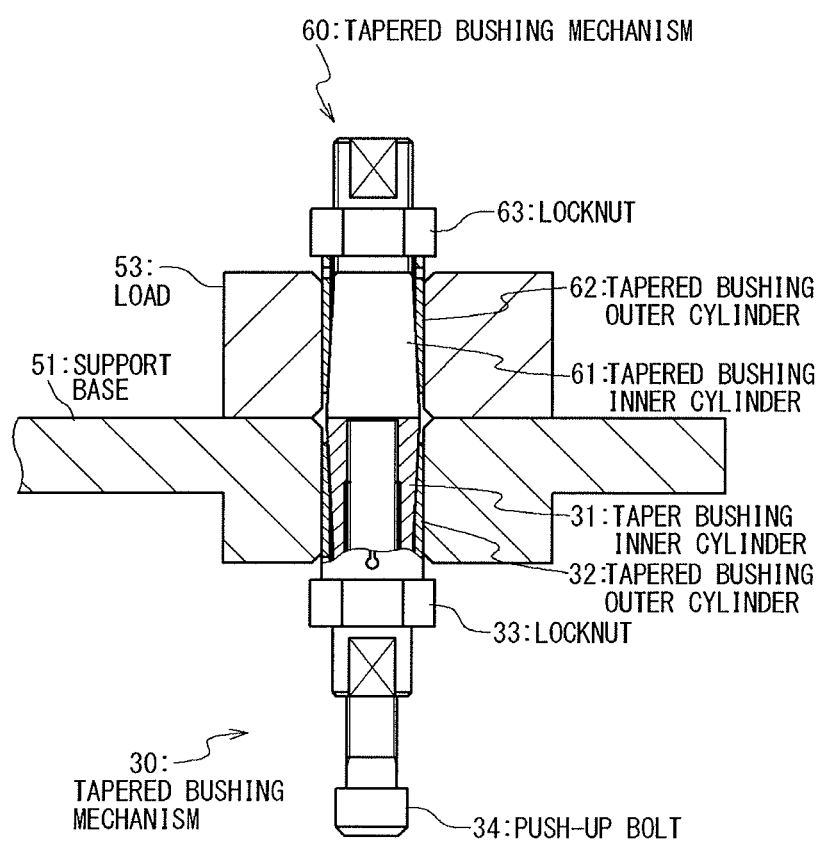
FIG. 9B is a partially sectional view showing a method of lifting the heavy load by using the tapered bushing mechanism.
Figure 9C:
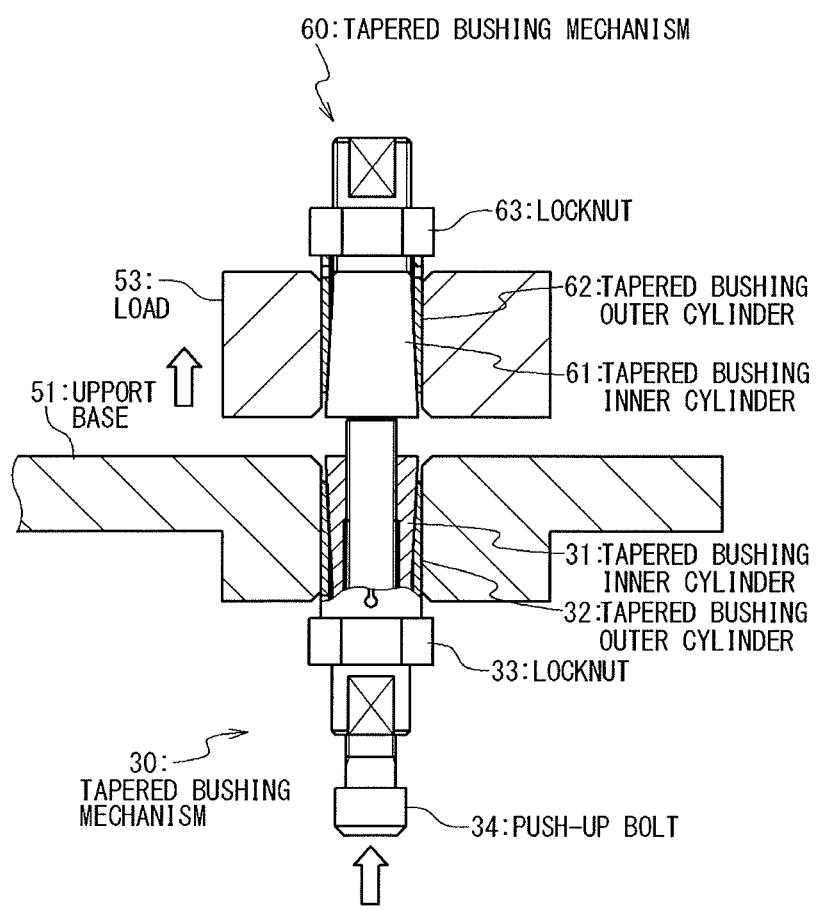
FIG. 9C is a partially sectional view showing a method of lifting the heavy load by using the tapered bushing mechanism.

FIGS. 9A to 9C are views showing an example of lifting a heavy load 53 provided on the support base 51. An example will be described below in which as shown in FIG. 9A, the through-holes are formed in the support base 51 and the heavy load 53, and the support base 51 and the heavy load 53 are coupled by a bolt 54 inserted into the through-hole and a nut 55.

At first, as shown in FIG. 9B, the tapered bushing mechanism 30 is inserted into the through-hole of the support base 51, and a tapered bushing mechanism 60 is inserted into the through-hole of the heavy load 53. The tapered bushing mechanism 30 contains the tapered bushing inner cylinder 31, the tapered bushing outer cylinder 32 and the locknut 33, which are structured as mentioned above. The tapered bushing inner cylinder 31 is oriented such that the end whose outer diameter is large is positioned up, and the tapered bushing outer cylinder 32 is oriented such that the end whose inner diameter is small is positioned down. The locknut 33 is engaged with and fastened by the screw thread 42a formed on the screw section 42 of the tapered bushing inner cylinder 31. Consequently, the tapered bushing inner cylinder 31 is downwardly pulled, and the tapered bushing mechanism 30 is inserted into the through-hole of the support base 51.

On the other hand, the tapered bushing mechanism 60 contains a tapered bushing inner cylinder 61, a tapered bushing outer cylinder 62 and a locknut 63. The tapered bushing inner cylinder 61 is structured similarly to the tapered bushing inner cylinder 31. However, the tapered bushing inner cylinder 61 is configured differently from the tapered bushing inner cylinder 31, such that the through-hole through which the push-up bolt is inserted is not formed. The tapered bushing inner cylinder 61 is used as the receptor member against which the push-up bolt 34 is pushed, as described later. The tapered bushing outer cylinder 62 and the locknut 63 are configured in the same manner as the tapered bushing outer cylinder 32 and the locknut 33. The tapered bushing inner cylinder 61 is oriented such that the end whose outer diameter is large is positioned down, and the tapered bushing outer cylinder 62 is oriented such that the end whose inner diameter is small is positioned up. The locknut 63 is engaged with and fastened by the screw thread formed on the tapered bushing inner cylinder 61. Consequently, the tapered bushing inner cylinder 61 is upwardly pushed, and the tapered bushing mechanism 60 is inserted into the through-hole of the heavy load 53.

Moreover, the push-up bolt 34 is engaged with the screw thread 41b (refer to FIG. 4B) formed on the inner surface of the tapered bushing inner cylinder 31. Consequently, the push-up bolt 34 is attached to the tapered bushing mechanism 30. The push-up bolt 34 is pushed against the tapered bushing inner cylinder 61 of the tapered bushing mechanism 60.

The above procedure is repeated for the desired number of times. Consequently, the necessary number of the tapered bushing mechanisms 30 and 60 are inserted into the through-holes of the heavy load 53 and the support base 51, and the necessary number of the push-up bolts 34 are attached to the tapered bushing mechanisms 30.

Next, as shown in FIG. 9C, the push-up bolt 34 attached to the tapered bushing mechanism 30 is turned. Consequently, the tapered bushing mechanism 60 and the heavy load 53 are pushed upwardly. At this time, in order to prevent each of the tapered bushing mechanisms 30 and 60 from being dropped, the push-up bolt 34 is operated such that a great variation is not generated between the loads applied to the push-up bolts 34.

In the above procedure, the mechanism of lifting the heavy load 53 can be attached to the support base 51 and the heavy load 53 without performing the tapping process on the support base 51 and the heavy load 53. Thus, this is effective to reduce a work amount. Also, the shapes of the through-holes of the support base 51 and the heavy load 53 are not substantially deformed through the work for attaching the tapered bushing mechanisms 30 and 60. Therefore, they can be used again to attach the heavy load 53 to the support base 51. Moreover, the above tapered bushing mechanism 30 is configured such that the hoop force applied to the through-hole of the support base 51 from the tapered bushing outer cylinder 32 becomes strong when the downward force is applied to the tapered bushing inner cylinder 31. Consequently, when the heavy load 53 is lifted, the tapered bushing mechanism 30 is not easily separated from the through-hole. Similarly, the tapered bushing mechanism 60 is configured such that the hoop force applied to the through-hole of the heavy load 53 from the tapered bushing outer cylinder 62 is increased, when the heavy load 53 is lifted and the upward force is applied to the tapered bushing inner cylinder 61. Consequently, when the heavy load 53 is lifted, tapered bushing mechanism 60 is not easily separated from the through-hole.

EXPLANATION OF REFERENCE NUMERALS

1: wind turbine generator
2: tower
2*a*: tower top flange
2*b*: bolt hole
3: nacelle
4: wind turbine rotor
5: rotor head
6: wing
7: yaw rotation bearing
8: brake disc
9: yaw motor
10: yaw brake caliper
11: inner ring
11*a*: screw hole
11*b*: screw thread
11*c*:
12: outer ring
13: rolling element
14: bolt
21: plug
22: O-ring
23: main body portion
24: reception portion
24*a*: O-ring ditch
24*b*: screw hole
30: tapered bushing mechanism
31: tapered bushing inner cylinder
32: tapered bushing outer cylinder
33: locknut
34: push-up bolt
41: taper section
41*a*: outer circumferential surface
41*b*: screw thread
42: screw section
42*a*: screw thread
42*b*: reception surface
43: taper section
44: main body portion
45: slit
46: penetrating hole
51: support base
51*a*: bolt hole
52: screw hole
53: heavy load
52*a*: screw hole
52*b*: screw thread
52*c*: end
54: bolt
55: nut

The invention claimed is:

1. A method of lifting a nacelle installed on a tower, comprising:
attaching a tapered bushing mechanism to a through-hole provided for a member of said tower;
attaching a push-up bolt to said tapered bushing mechanism; and
raising said push-up bolt while pushing said push-up bolt against a first member provided for said nacelle,
wherein said tapered bushing mechanism comprises a tapered bushing inner cylinder and a tapered bushing outer cylinder,
wherein said tapered bushing inner cylinder comprises a first taper section whose outer diameter becomes larger toward an end of said tapered bushing inner cylinder and a first screw thread formed on an inner surface of said tapered bushing inner cylinder,
wherein said tapered bushing outer cylinder comprises a second taper section whose inner diameter becomes smaller toward an end of said tapered bushing outer cylinder,
wherein said attaching said tapered bushing mechanism to said through-hole comprises:
inserting said tapered bushing mechanism in said through-hole such that the end of said tapered bushing inner cylinder is positioned on an up side, the end of said tapered bushing outer cylinder is positioned on a down side, an outer circumferential surface of said first taper section and an inner surface of said second taper section contact, and an outer circumferential surface of said tapered bushing outer cylinder contacts said through-hole; and
pulling down said tapered bushing inner cylinder in a state that said tapered bushing mechanism has been inserted in said through-hole, and
wherein said raising said push-up bolt comprises turning said push-up bolt in a state that said push-up bolt has been engaged with said first screw thread.

2. The method according to claim 1, wherein said through-hole is formed in a tower top flange attached in an upper end of said tower.

3. The method according to claim 2, further comprising:
removing a bolt which couples said first member with said tower and which has been engaged with a screw hole provided for said first member through said through-hole; and
inserting a plug in said screw hole,
wherein said raising said push-up bolt comprises pushing said push-up bolt against said plug.

4. The method according to claim 3, wherein said first member comprises a yaw rotation bearing which rotatably couples said nacelle with said tower.

5. The method according to claim 1, wherein said pulling down said tapered bushing inner cylinder comprises:
screwing a locknut with a second screw thread provided for the outer circumferential surface of said tapered bushing inner cylinder in the state that said locknut is pushed to said tapered bushing outer cylinder.

6. The method according to claim 5, wherein said tapered bushing inner cylinder is coupled with said first taper section and comprises a screw section in which said second screw thread is formed,
wherein said screw section has two flat receptor surfaces which are parallel to each other surfaces, and
wherein said receptor surfaces are caught by a tool to support said tapered bushing inner cylinder, when said locknut is engaged with said second screw thread.

7. The method according to claim 1, wherein a slit is provided for said tapered bushing outer cylinder to extend in a length direction of said tapered bushing outer cylinder.

8. The method according to claim 7, wherein said tapered bushing outer cylinder further comprises a through-hole which communicates with said slit at an end of said slit and which penetrates between the outer surface and the inner surface of said tapered bushing outer cylinder.

9. A nacelle lifting mechanism which is attached to a through-hole provided for a member of a tower, comprising:
a tapered bushing inner cylinder;
a tapered bushing outer cylinder; and a push-up bolt pushed against a member provided for said nacelle, wherein said tapered bushing inner cylinder comprises a first taper section whose outer diameter becomes larger toward an end of said tapered bushing inner cylinder and a first screw thread which is engaged with said push-up bolt and formed on inner surface of said tapered bushing inner cylinder, wherein said tapered bushing outer cylinder comprises a second taper section whose inner diameter becomes smaller toward an end of said tapered bushing outer cylinder, and an outer circumferential surface pushed against said through-hole, wherein said second taper section comprises an inner surface of a shape which fits with a shape of said outer circumferential surface of said first taper section, and wherein said push-up bolt moves in a length direction of said tapered bushing inner cylinder, when said push-up bolt is turned in a state that said push-up bolt has been engaged with said first screw thread.

10. The nacelle lifting mechanism according to claim 9, further comprising:

a locknut which fastens said tapered bushing inner cylinder and said tapered bushing outer cylinder, wherein said tapered bushing inner cylinder further comprises a screw section coupled with said first taper section, and wherein a second screw thread is formed on the outer circumferential surface of said screw section so as to be engaged with said locknut.

11. The nacelle lifting mechanism according to claim 9, wherein said tapered bushing outer cylinder further comprises a slit to extend in a length direction of said tapered bushing outer cylinder.

12. The nacelle lifting mechanism according to claim 11, wherein said tapered bushing outer cylinder comprises further comprises a penetrating hole which communicates with an end of said slit and which passes between the inner surface and the outer surface of said tapered bushing outer cylinder.

13. The nacelle lifting mechanism according to claim 9, further comprising:

a locknut pushed against said tapered bushing outer cylinder, wherein said tapered bushing inner cylinder further comprises a screw section coupled with said first taper section, wherein a second screw thread is formed on the outer circumferential surface of said screw section to be engaged with said locknut, and wherein said screw section has two flat receptor surfaces which are parallel to each other.

* * * * *